(«12») United States Patent
Ishii

(10) Patent No.: US 9,277,150 B2
(45) Date of Patent: Mar. 1, 2016

(54) IMAGE PICKUP APPARATUS AND CAMERA SYSTEM CAPABLE OF IMPROVING CALCULATION ACCURACY OF DEFOCUS AMOUNT

(75) Inventor: Hirokazu Ishii, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 13/442,330

(22) Filed: Apr. 9, 2012

(65) Prior Publication Data
US 2012/0262604 A1 Oct. 18, 2012

(30) Foreign Application Priority Data

Apr. 14, 2011 (JP) ................................. 2011-090045

(51) Int. Cl.
*H04N 5/369* (2011.01)
*H04N 5/232* (2006.01)
*H04N 9/04* (2006.01)

(52) U.S. Cl.
CPC ......... *H04N 5/3696* (2013.01); *H04N 5/23212* (2013.01); *H04N 9/045* (2013.01)

(58) Field of Classification Search
CPC .................................................... H04N 5/3696
USPC ........................................ 348/231.9, 231.99
See application file for complete search history.

(56) References Cited

U.S. PATENT DOCUMENTS

| 5,367,153 | A * | 11/1994 | Suda et al. | ................. | 250/201.8 |
| 2008/0074534 | A1 * | 3/2008 | Kusaka | .......................... | 348/364 |
| 2008/0084483 | A1 * | 4/2008 | Kusaka | ..................... | 348/222.1 |
| 2008/0240701 | A1 * | 10/2008 | Kusaka | ......................... | 396/104 |
| 2008/0258039 | A1 * | 10/2008 | Kusaka | ...................... | 250/201.8 |
| 2009/0278966 | A1 * | 11/2009 | Kusaka | .......................... | 348/294 |
| 2010/0188522 | A1 * | 7/2010 | Ohnishi et al. | ............. | 348/222.1 |
| 2011/0076001 | A1 * | 3/2011 | Iwasaki | .......................... | 396/114 |

(Continued)

FOREIGN PATENT DOCUMENTS

| JP | 2000-292686 A | 10/2000 |
| JP | 2004-336452 A | 11/2004 |

(Continued)

OTHER PUBLICATIONS

Japanese Office Action issued in corresponding application No. 2011-090045 on Apr. 30, 2013.

(Continued)

*Primary Examiner* — Roberto Velez
*Assistant Examiner* — Cynthia Segura
(74) *Attorney, Agent, or Firm* — Carter, DeLuca, Farrell & Schmidt, LLP

(57) ABSTRACT

An image pickup apparatus includes an image pickup element that includes imaging pixels and focus detection pixels and that performs a photoelectric conversion of an object image, a readout unit that reads a pair of image signals from the focus detection pixels with a predetermined period, a storage unit that stores the pair of image signals read by the readout unit and optical information of the pair of image signals, an addition unit that adds a plurality of signals of time-series continuous frames of the pair of image signals, and a conversion coefficient determination unit that determines a conversion coefficient that converts an image shift amount of a pair of image signals of an addition frame obtained by the addition unit into a defocus amount, and the conversion coefficient determination unit determines the conversion coefficient of the addition frame based on the time-series continuous optical information.

12 Claims, 14 Drawing Sheets

(56) References Cited

U.S. PATENT DOCUMENTS

| | | | |
|---|---|---|---|
| 2011/0096171 A1* | 4/2011 | Kimura | G02B 7/34 348/187 |
| 2011/0205423 A1* | 8/2011 | Tsukada | 348/345 |
| 2011/0273599 A1* | 11/2011 | Murata | 348/294 |
| 2011/0273608 A1* | 11/2011 | Tsukada | 348/345 |
| 2012/0162493 A1* | 6/2012 | Wakamiya | H04N 5/3696 348/345 |
| 2012/0327267 A1* | 12/2012 | Takahara | G02B 7/34 348/231.99 |

FOREIGN PATENT DOCUMENTS

| | | |
|---|---|---|
| JP | 2008-085738 A | 4/2008 |
| JP | 2008-306297 A | 12/2008 |
| JP | 2010-091943 A | 4/2010 |

OTHER PUBLICATIONS

Japanese Office Action issued in corresponding application No. 2013-248948 on Sep. 30, 2014.

* cited by examiner

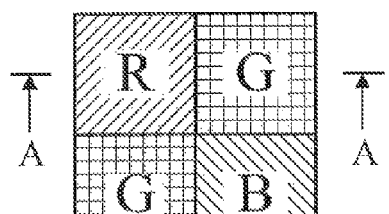
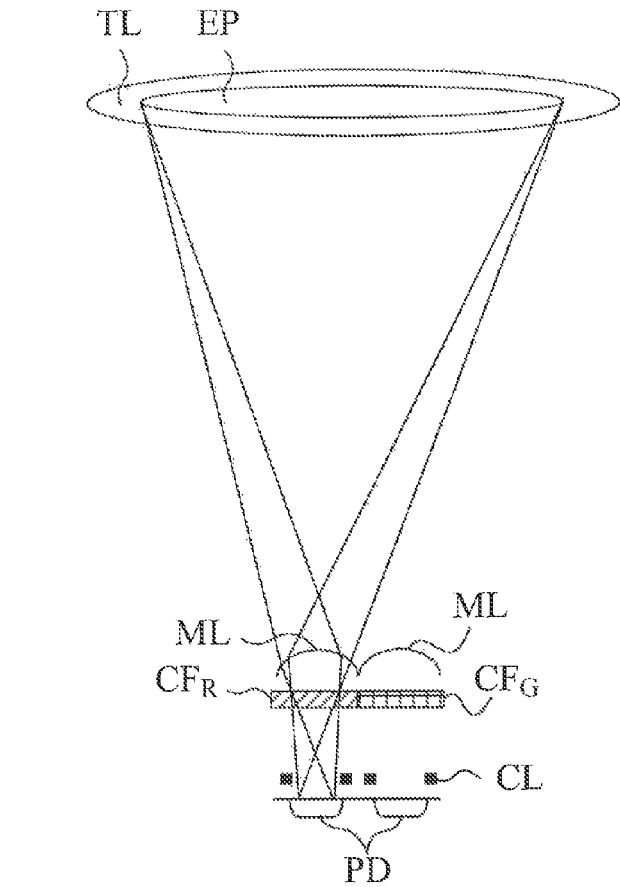
PLAN VIEW
A-A CROSS-SECTIONAL VIEW
FIG. 3A
FIG. 3B

PLAN VIEW        A-A CROSS-SECTIONAL VIEW

PLAN VIEW

A-A CROSS-SECTIONAL VIEW

IMAGE PICKUP APPARATUS AND CAMERA SYSTEM CAPABLE OF IMPROVING CALCULATION ACCURACY OF DEFOCUS AMOUNT

BACKGROUND OF THE INVENTION

1. Field of the Invention

The present invention relates to an image pickup apparatus such as a digital camera or a video, 2. Description of the Related Art Previously, there has been an image pickup element that has a phase difference detection function of an object image to achieve a high-speed phase difference AF without using a dedicated AF sensor. Japanese Patent Laid-Open No. 2000292686 discloses pixels of an image pickup element to which a pupil division function is given by decentering a sensitivity region of a light receiving portion with respect to an optical axis of an on-chip microlens. These pixels are used a focus detection pixels and are arranged between imaging pixels at a predetermined interval to perform phase difference focus detection. Japanese Patent Laid-Open No. 2008-085738 discloses an image pickup apparatus that adds image data of focus detection pixels stored by a plurality of past readouts to perform focus detection calculation in order to satisfy both a refresh operation with a short period and focus detection for a low-luminance object.

The image pickup apparatus disclosed in Japanese Patent Laid-Open No. 2008-085738 stores image data of the focus detection pixel in each frame and performs the focus detection calculation based on image data obtained by adding the image data of the focus detection pixel stored by the plurality of past readouts. However, when a stop value, a focal length, or the like changes during obtaining the image data of the focus detection pixel, a shift of a defocus amount that is to be converted from an image shift amount is generated.

SUMMARY OF THE INVENTION

The present invention provides an image pickup apparatus and a camera system that improve a calculation accuracy of a defocus amount.

An image pickup apparatus as one aspect of the present invention includes an image pickup element that includes imaging pixels and focus detection pixels, configured to perform a photoelectric conversion of an object image, a readout unit configured to read a pair of image signals from the focus detection pixels with a predetermined period, a storage unit configured to store the pair of image signals read by the readout unit and optical information of the pair of image signals, an addition unit configured to add a plurality of signals of time-series continuous frames of the air of image signals, and a conversion coefficient determination unit configured to determine a conversion coefficient that converts an image shift amount of a pair of image signals of an addition frame obtained by the addition unit into a defocus amount. The conversion coefficient determination unit determines the conversion coefficient of the addition frame based on the time-series continuous optical information.

An image pickup apparatus as another aspect of the present invention includes an image pickup element that includes imaging pixels and focus detection pixels, configured to perform a photoelectric conversion of an object image, a readout unit configured to read a pair of image signals from the focus detection pixels with a predetermined period, a storage unit configured to store the pair of image signals read by the readout unit and optical information of the pair of image signals, an addition unit configured to add a plurality of signals of time-series continuous frames of the pair of image signals, and a conversion coefficient determination unit configured to determine a conversion coefficient that converts an image shift amount of a pair of image signals of an addition frame obtained by the addition unit into a defocus amount. The addition unit stops adding the plurality of signals of the frames when the time-series continuous optical information is changed, and starts adding the plurality of signals of the frames after the optical information is changed.

A camera system as another aspect of the present invention includes a lens apparatus including a lens, configured to form an object image, and the image pickup apparatus.

Further features and aspects of the present invention will become apparent from the following description of exemplary embodiments with reference to the attached drawings.

BRIEF DESCRIPTION OF THE DRAWINGS

FIGS. 3A and 3B are a plan view and a cross-sectional view, respectively, of an imaging pixel of the image pickup element in the present embodiment.

FIG. 8 is a view of illustrating an arrangement region of the focus detection pixels in the present embodiment.

DESCRIPTION OF THE PREFERRED EMBODIMENTS

Figure 1:
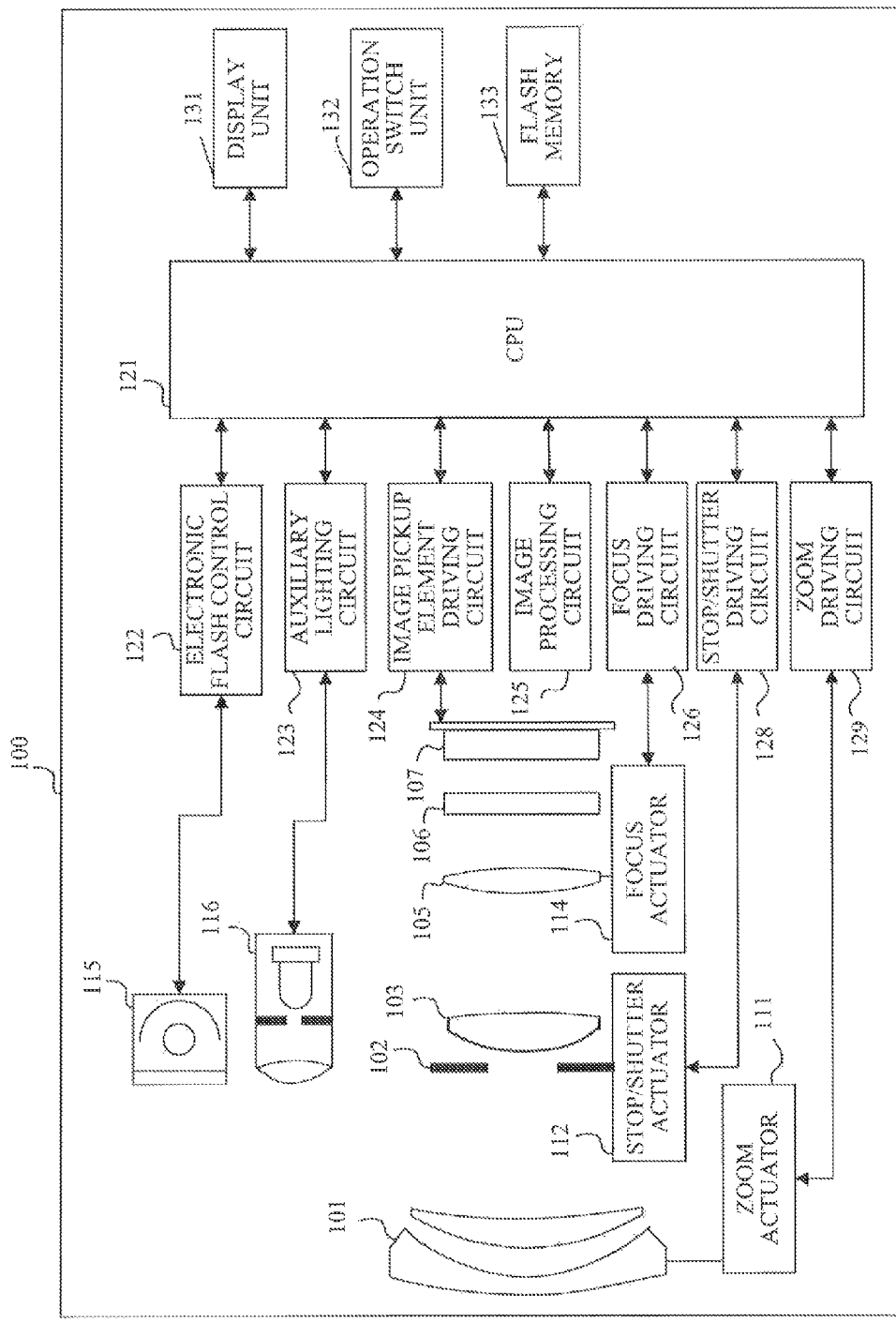
FIG. 1 is a configuration diagram of a camera in the present embodiment.

Exemplary embodiments of the present invention will be described below with reference to the accompanied drawings. In each of the drawings, the same elements will be denoted by the same reference numerals and the duplicate descriptions thereof will be omitted.

[Embodiment 1]

FIG. 1 is a configuration diagram of a camera in Embodiment 1 of the present invention, which illustrates a camera 100 that is integrally configured by a camera body (an image pickup apparatus) having an image pickup element and an image pickup optical system (a lens apparatus). However, the present embodiment is not limited to this, and can also be applied to a camera system that is configured by the image pickup optical system (the lens apparatus) that is removable from the camera body (the image pickup apparatus).

In FIG. 1, reference numeral 101 denotes a first lens unit that is disposed at an end of the image pickup optical system that forms an object image, which is held so as to be movable in an optical axis direction. Reference numeral 102 denotes a shutter with a stop, which adjusts its aperture diameter to perform a light intensity adjustment in taking an image and also has a function as a shutter for adjusting an exposure time in taking a still image. Reference numeral 103 denotes a second lens unit. The shutter with the stop 102 and the second lens unit 103 are integrally configured so as to be movable in the optical axis direction, and perform a magnification-varying operation (a zoom function) in conjunction with the moving operation of the first lens unit 101.

Reference numeral 105 denotes a third lens unit, which moves in the optical axis direction to perform focusing operation. Reference numeral 106 denotes an optical low-pass filter, which is an optical element that reduces a false color or a moire of a shot image. Reference numeral 107 denotes an image pickup element that is configured by a C-MOS sensor and its peripheral circuit. As the image pickup element 107, for example, a two-dimensional single plate color sensor that includes a primary color mosaic filter having Bayer array is formed on a light receiving pixel having m pixels in a lateral direction and having n pixels in a vertical direction in an on-chip configuration is used. As described below, the image pickup element 107 includes imaging pixels and focus detection pixels, which performs a photoelectric conversion of the object image.

Reference numeral 111 denotes a zoom actuator, which rotates a cam cylinder (not shown) to move the first lens unit 101 to the third lens unit 103 in the optical axis direction to perform the magnification-varying operation. Reference numeral 112 denotes a stop/shutter actuator, which controls the aperture diameter of the shutter with the stop 102 to adjust a shooting light intensity and also controls the exposure time in taking the still image. Reference numeral 114 denotes a focus actuator, which moves the third lens unit 105 in the optical axis direction to perform the focusing operation.

Reference numeral 115 denotes an object illuminating electronic flash in taking the image, which suitably uses a flash illumination apparatus that uses a xenon tube, but the present embodiment is not limited to this, and alternatively, for example an illumination apparatus including an LED that continuously emits light may also be used. Reference numeral 116 denotes an AF auxiliary lighting unit, which projects an image of a mask having a predetermined opening pattern onto an object via a projection lens to improve focus detection capability for a dark object or an object with a low contrast.

Reference numeral 121 denotes a CPU (a camera controller), which is a camera CPU that governs various controls of the camera body. The CPU 121 includes a processor, a ROM, a RAM, and A/D converter, a D/A converter, a communication interface circuit, and the like, and drives various kinds of circuits of the camera 100 based on a predetermined program stored in the ROM to perform a series of operations such as AF, image shooting, image processing, recording, and the like.

Reference numeral 122 denotes an electronic flash control circuit, which performs a lighting control of the electronic flash 115 in synchronization with the image shooting operation. Reference numeral 123 denotes an auxiliary lighting circuit, which performs a lighting control of the AF auxiliary lighting unit 116 in synchronization with the focus detection operation. Reference numeral 124 denotes an image pickup element driving circuit, which controls the image shooting operation of the image pickup element 107 and also performs the A/D conversion of the obtained image signal to send it to the CPU 121. Reference numeral 125 denotes an image processing circuit, which performs processings such as a δ (gamma) conversion, a color interpolation, and a JPEG compression for the image obtained by the image pickup element 107.

Reference numeral 126 denotes a focus driving circuit, which performs a driving control of the focus actuator 114 based on the focus detection result to move the third lens unit 105 to perform the focusing operation. Reference numeral 128 denotes a stop/shutter driving circuit, which performs a driving control of the stop/shutter actuator 112 to control the aperture of the shutter with the stop 102. Reference numeral 129 denotes a zoom driving circuit, which drives the zoom actuator 111 in accordance with a zoom operation by a user.

References numeral 131 denotes a display unit such as an LCD, which displays information related to an imaging mode of the camera 100, a preview image before taking an image, a confirmation image after taking the image, an in-focus state displaying image at the time of performing the focus detection, and the like. Reference numeral 132 denotes an operation switch unit, which is configured by a power switch, a release (imaging trigger) switch, a zoom operation switch, am imaging mode selecting switch, and the like. Reference numeral 133 denotes a removable flash memory, which records the shot image.

Figure 2:
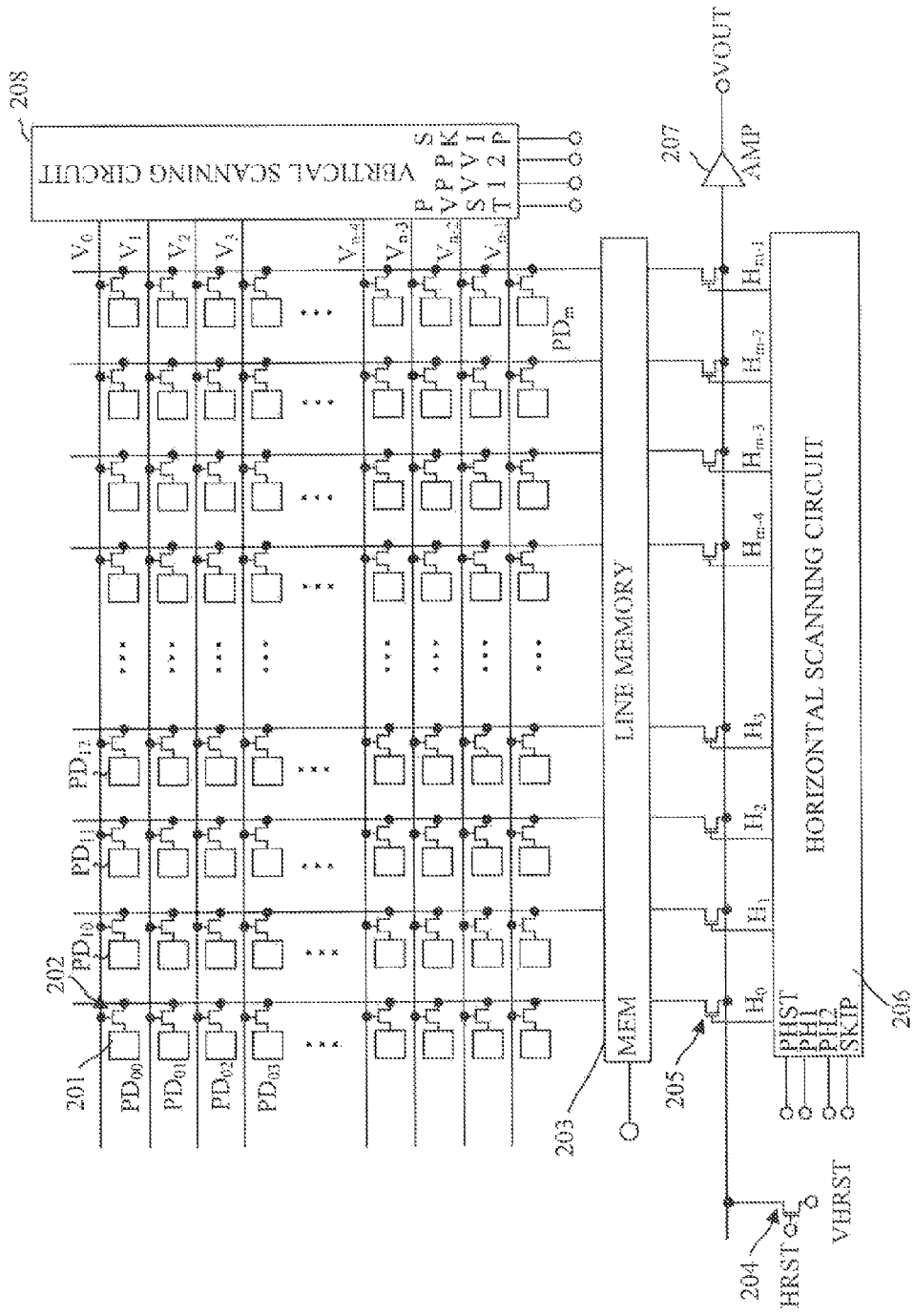
FIG. 2 is a block diagram of an image pickup element (a solid-state image pickup element) in the present embodiment.

FIG. 2 illustrates a block diagram of the image pickup element 107. The block diagram of FIG. 2 illustrates a minimum configuration necessary to describe the readout operation of the image signal, and a pixel reset signal and the like is omitted. In FIG. 2, reference numeral 201 denotes a photoelectric conversion portion (hereinafter, referred to also as a "$PD_{mn}$" where m is an address in an X direction and m=0, 1,..., m−1, and n is an address in an Y direction and n=0, 1,..., n−1), which is configured by a photodiode, a pixel amplifier, a switch for reset, and the like. The image pickup element 107 of the present embodiment is configured by arranging the photoelectric conversion portions of m×n on a two-dimensional plane. Reference signs are only added around the photoelectric conversion portion $PD_{00}$ at the upper left in order to avoid complexity.

Reference numeral 202 denotes a switch that selects an output of the photoelectric conversion portion 201 ($PD_{mn}$), which is selected by a vertical scanning circuit 208 for each row. Reference numeral 203 denotes a line memory (MEM) that temporarily stores the output of the photoelectric conversion portion 201 ($PD_{mn}$), which stores the outputs of the photoelectric conversion portions 201 ($PD_{mn}$) for one row that are selected by the vertical scanning circuit 208. As the line memory 203, commonly, a capacitor is used.

Reference numeral 204 denotes a switch that is connected with a horizontal output line to reset the horizontal output line to a predetermined electric potential VHRST, which is controlled by a signal HRST. Reference numeral 205 denotes switches ($H_0$ to $H_{m-1}$) that sequentially output the output signal of the photoelectric conversion portion 201 ($PD_{mn}$) stored in the line memory 203 to the horizontal output line. The switches 205 ($H_0$ to $H_{m-1}$) are sequentially scanned by a horizontal scanning circuit 206 described below to read the outputs of the photoelectric conversions for each row.

Reference numeral 206 denotes a horizontal scanning circuit, which sequentially operates the outputs of the photoelectric conversion portions 201 stored in the line memory 203 to be outputted to the horizontal output line. The signal PHST is a data input of the horizontal scanning circuit 206, reference signs PH1 and PH2 denote shift clock inputs, and the data is set on condition of PH1=H and the data is latched by the input of PH2. The signal PHST is sequentially shifted by inputting the shift clocks to the shift clock inputs PH1 and PH2, and therefore the switches 205 ($H_0$ to $H_{m-1}$) can be sequentially turned on. A signal SKIP is a control input signal that performs a setting in a decimation reading. The horizontal scanning circuit 206 can be skipped at a predetermined interval by setting the signal SKIP to the H level. Reference numeral 207 denotes an amplifier AMP that amplifies the signal of the horizontal output line to output the signal to a terminal VOUT.

Reference numeral 208 denotes a vertical scanning circuit, which can select the switch 202 of the photoelectric conversion portion 201 ($PD_{mn}$) by performing a sequential scanning to output control signals $V_0$ to $V_{n-1}$. The control signal is, similarly to the case of the horizontal scanning circuit 206, controlled by a signal PVST that is a data input, shift clocks PV1 and PV2, and a signal SKIP that sets the decimation reading. The details of the operations are similar to the horizontal scanning circuit 206, and therefore the descriptions are omitted.

FIGS. 3A, 3B, 4A, 4B, 5A, and 5B are diagrams of describing the structures of the imaging pixel and the focus detection pixel. In the present embodiment, the Bayer array in which a pixel having spectral sensitivity of G (green) is disposed on each of two diagonal pixels of the four pixels of 2×2 and pixels having spectral sensitivities of R (red) and B (blue) are disposed on other two pixels respectively is adopted. The focus detection pixels each having a structure described below are dispersed and disposed in a predetermined pattern in the Bayer array.

FIGS. 3A and 3B illustrate the arrangement and the structure of the imaging pixel. FIG. 3A is a plan view of the imaging pixels of two rows×two columns. As is well known, the G pixels are disposed in a diagonal direction and the R and B pixels are disposed as the other two pixels in the Bayer array. The structure of the two rows×two columns is repeatedly disposed.

FIG. 3B is a cross-sectional view of illustrating a cross section A-A in FIG. 3A. Reference sign ML denotes an on-chip microlens that is disposed at the front of each pixel, reference sign CFR denotes a color filter for R (Red), and reference sign CFG denotes a color filter for G (Green). Reference sign PD schematically illustrates the photoelectric conversion portion of the C-MOS sensor, and reference sign CL denotes a writing layer that forms a signal line transferring various kinds of signals in the C-MOS sensor. Reference sign TL schematically illustrates an image pickup optical system.

The on-chip microlens ML and the photoelectric conversion portion PD of the imaging pixel are configured so as to effectively introduce a light beam passing through the image pickup optical system TL as much as possible. In other words, an exit pupil EP of the image pickup optical system TL and the photoelectric conversion portion PD have a conjugate relation with each other by the microlens ML, and an effective area of the photoelectric conversion portion PD is designed to be a large area. FIG. 3B described the incident light beam on the G pixel, and the R (Red) pixel and the B (Blue) pixel also have the same structure. Accordingly, the diameter of the exit pupil EP that corresponds to each of the imaging pixels of RGB is large, and the light beam from the object is efficiently introduced to improve an S/N ratio of the image signal.

Figure 4A:
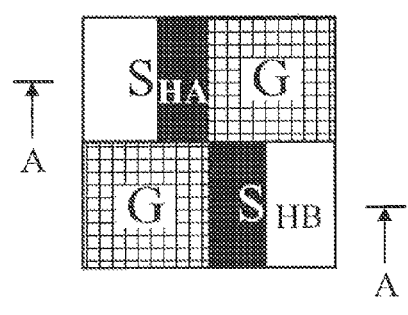
FIGS. 4A and 4B are a plan view and a cross-sectional view, respectively, of a focus detection pixel of the image pickup element in the present embodiment.
Figure 4B:
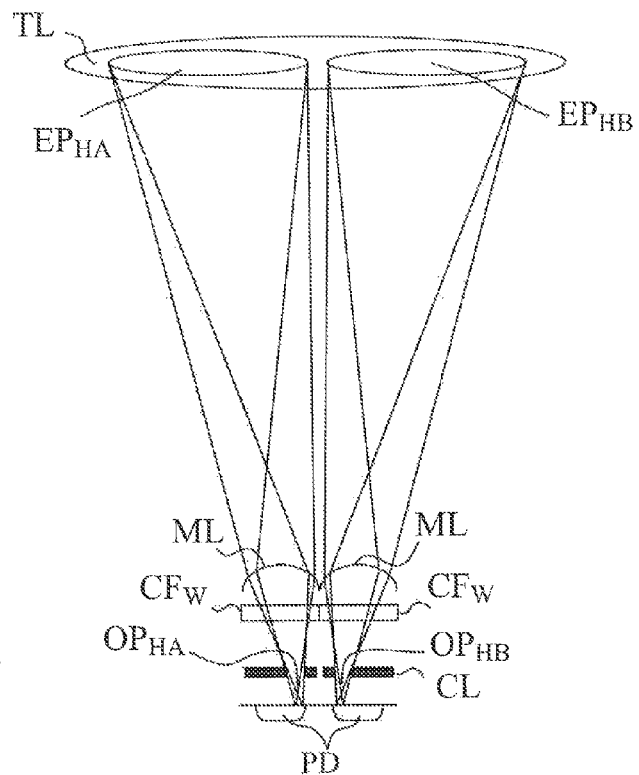

FIG. 4A and 4B illustrate the arrangement and the structure of the focus detection pixel that performs a pupil division in a horizontal direction (a lateral direction) of the image pickup optical system. The horizontal direction (the lateral direction) indicates a direction along a straight line that is orthogonal to the optical axis and that extends to the horizontal direction when the camera is held so that the optical axis of the image pickup optical system is horizontal. FIG. 4A is a plan view of the pixels of two rows×two columns which include the focus detection pixel. When the image signal that is to be recorded or to be watched is obtained, a principal component of luminance information is obtained by the G pixel. Since image recognition characteristics of a human are sensitive to the luminance information, the deterioration of the image quality is easily recognized if the G pixel is defective. On the other hand, the R pixel and the B pixel are pixels that obtain color information (color difference information). However, since visual characteristics of the human are insensitive to the color information, the deterioration of the image quality is not easily recognized even when the pixels obtaining the color information contain some pixels having defects. Accordingly, in the present embodiment, the G pixel of the pixels of two rows×two columns remains as the imaging pixel, and the R and B pixels are replaced with the focus detection pixels. This is denoted by reference signs $S_{HA}$ and $S_{HB}$ in FIG. 4A.

FIG. 4B is a cross-sectional view of illustrating a cross section A-A in FIG. 4A. The microlens ML and the photoelectric conversion portion PD have the same structure as those of the imaging pixel illustrated in FIG. 3B. In the present embodiment, since the signal of the focus detection pixel is not used for creating the image, a transparent film CFW (White) is disposed instead of the color separation filter. Furthermore, in order to perform the pupil division using the image pickup element, an opening portion of the wiring layer CL is displaced in one direction with respect to a center line of the microlens ML. Specifically, since an opening portion $OP_{HA}$ of the pixel $S_{HA}$ is displaced to the right side, it receives a light beam which passes through an exit pupil $EP_{HA}$ at the left side of the image pickup optical system TL. Similarly, since an opening portion $OP_{HB}$ of the pixel $S_{HB}$ is displaced to the light side, it receives a light beam which passes through an exit pupil $EP_{HB}$ at the right side of the image pickup optical system TL. The pixels $S_{HA}$ is regularly arrayed in a horizontal direction, and an object image that is obtained by these pixel groups is defined as an A image. Furthermore, the pixels $S_{HB}$ are regularly arrayed in the horizontal direction, and an object image that is obtained by these pixel groups is defined as a B image. Then, a relative position of the A image and the B image is detected and therefore a focus shift amount (a defocus amount) of the object image can be detected.

The pixels $S_{HA}$ and $S_{HB}$ can perform focus detection for an object which has a luminance distribution in a lateral direction of a shooting screen, for example a vertical line, but they cannot perform the focus detection for a lateral line that has a luminance distribution in a vertical direction. In the present embodiment, a pixel which performs the pupil division in a perpendicular direction (the vertical direction) of the image pickup optical system is also included so as to perform the focus detection in the latter case.

Figures 5A, 5B:
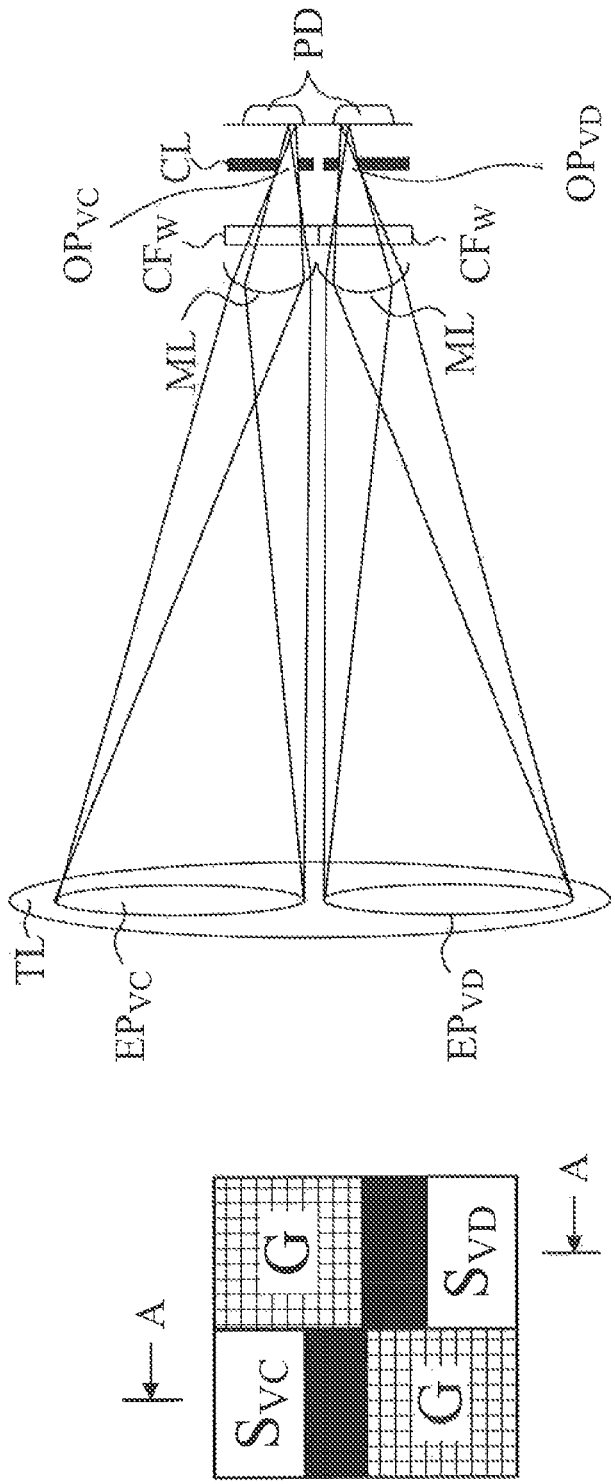
FIGS. 5A and 5B are a plan view and a cross-sectional sectional view, respectively, of a focus detection pixel of the image pickup element in the present embodiment.

FIGS. 5A and 5B illustrate an arrangement and a structure of the focus detection pixel to perform the pupil division in the perpendicular direction (in other words, an upward and downward direction, or the vertical direction) of the image pickup optical system. The perpendicular direction, i.e. the upward and downward direction or the vertical and lateral direction, means a direction along a straight line that is orthogonal to the optical axis and that extends to the vertical direction when the camera is held so that the optical axis of the image pickup optical system is horizontal. FIG. 5A is a plan view of pixels of two rows×two columns that include the focus detection pixel, and similarly to FIG. 4A, a G pixel remains as the imaging pixel and a R pixel and a B pixel are used as the focus detection pixel. These pixels are illustrated as $S_{VC}$ and $S_{VD}$ in FIG. 5A.

FIG. 5B is a cross-sectional view of illustrating a cross section A-A of FIG. 5A. The pixel of FIG. 4B has the structure of performing the pupil division in the lateral direction, and on the other hand, the pupil division direction of the pixel of FIG. 5B is the vertical direction. Other pixel structures in FIG. 5B are the same as the structures in FIG. 4B. In other words, since the opening portion $OP_{VC}$ of the pixel $S_{VC}$ is displaced to the lower side, it receives a light beam which passes through an exit pupil $EP_{VC}$ at the upper side of the image pickup optical system TL. Similarly, since the opening portion $OP_{VD}$ of the pixel SVD is displaced to the upper side, it receives a light beam which passes through an exit pupil $EP_{VD}$ at the lower side of the image pickup optical system TL. The pixels $S_{VC}$ are regularly arrayed in the perpendicular direction, and an object image that is obtained by these pixel groups are defined as a C image. Furthermore, the pixels $S_{VD}$ are regularly arrayed in the perpendicular direction, and an object image that is obtained by these pixel groups are defined as a D image. Then, a relative position between the C image and the D image is detected, and therefore a focus shift amount (a defocus amount) of the object image that has a luminance distribution in the perpendicular direction can be detected.

Figures 6A, 6B:
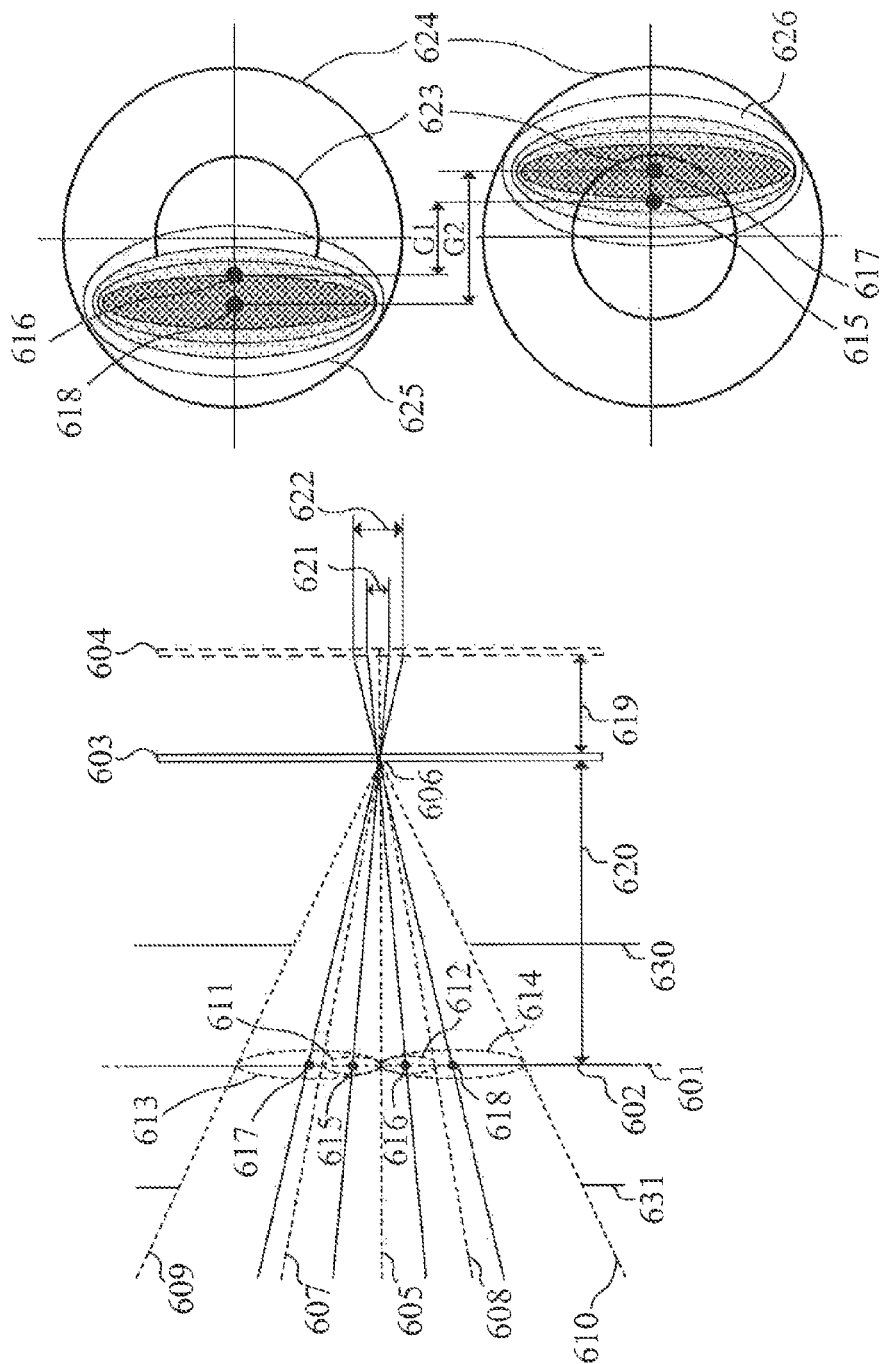
FIGS. 6A and 6B are diagrams of describing a vignetting of the focus detection pixel and a distance of centers of gravity of focus detection light beams.

Subsequently, a method of obtaining a conversion coefficient for calculating the defocus amount based on an image shift amount will be described. The conversion coefficient is calculated based on diameter information of the image pickup optical system and a sensitivity distribution of the focus detection pixel. A light beam that is restricted by some configuration member such as a lens holding frame of the image pickup optical system TL and the shutter with the stop 102 enters an image senor (the image pickup element 107). FIGS. 6A, 6B, 7A, and 7B are diagrams of illustrating situations where the light beam which is used for the focus detection is restricted by the vignetting of the image pickup optical system. FIGS. 6A and 6B illustrate a condition where a light beam is restricted by a stop 602 of an imaging optical system that is disposed at a position of an exit pupil plane 601. In FIG. 6A, reference numerals 603 and 604 denote an image sensor (reference numerals 603 denotes an image sensor which is disposed at a position of an estimated imaging plane), reference numeral 605 denotes an optical axis, and reference numeral 606 denotes a position of the optical axis on the image sensor 603. Reference numerals 607 and 608 denote a light beam that is restricted by the stop 602, and reference numerals 609 and 610 denote a light beam that is not restricted by the stop 602. Reference numerals 611 and 612 denote focus detection light beams for the light beams 607 and 608, respectively. Reference numerals 615 and 616 denote positions of centers of gravity of the focus detection light beam 611 and 612, respectively. Similarly, reference numerals 613 and 614 denote focus detection light beams for the light beams 609 and 610, respectively. Reference numerals 617 and 618 denote positions of centers of gravity of the focus detection light beams 613 and 614, respectively. Reference numeral 630 denotes a lens holding frame which is disposed at a side closest to the image sensor, and reference numeral 631 denotes a lens holding frame which is disposed at a side closest to the object.

FIG. 6B is a diagram of describing the change of the center of gravity that is caused by the vignetting on the exit pupil plane 601 of the focus detection pixel at the center of the image sensor. In FIG. 6B, reference numerals 623 and 624 denote pupil regions of the light beams 607 and 608 that are restricted for the center pixel of the image sensor 604, and of the light beams 609 and 610 that are not restricted for the pixel, respectively. Reference numerals 625 and 626 denote incidence angle characteristics of focus detection pixels $S_{HA}$ and $S_{HB}$, respectively. Light beams transmitting the inside of the pupil regions 623 and 624 enter the focus detection pixels $S_{HA}$ and $S_{HB}$ at the sensitivity distributions indicated by the incidence angle characteristics 625 and 626, respectively. Therefore, the distances of the centers of gravity that are obtained on conditions that the focus detection light beam is restricted and the focus detection light beam is not restricted can be calculated by obtaining the centers of gravity of the distributions of the focus detection light beams transmitting the inside of the pupil regions 623 and 624, respectively. The conversion coefficient that is used to calculate the defocus amount based on the image shift amount can be obtained by obtaining the sensitivity distribution information of the focus detection pixel and the diameter information of the imaging optical system by the measurement and the calculation to be previously stored.

In FIG. 6A, a defocus amount 619 is defined as DEF, and a distance 620 from the image sensor 603 to the exit pupil plane 601 is defined as L. Distances of the centers of gravity on conditions that the focus detection light beam is restricted and the focus detection light beam is not restricted are defined as G1 (a distance between the positions of centers of gravity 615 and 616) and G2 (a distance between the positions of centers of gravity 617 and 618), respectively. Image shift amounts 621 and 622 are defined as PRED1 and PRED2, respectively, and conversion coefficients of converting the image shift amounts 621 and 622 into the defocus amount DEF are defined as K1 and K2, respectively. In this case, the defocus amount DEF can be obtained by the following Expression (1).

$$DEF = K1 \times PRED1 = K2 \times PRED2 \tag{1}$$

The conversion coefficient K1 and K2 that converts the image shift amounts 621 and 622 into the defocus amount DEF are obtained by the following Expressions (2-a) and (2-b), respectively.

$$K1 = L/G1 \tag{2-a}$$

$$K2 = L/G2 \tag{2-b}$$

When the focus detection position is not near the optical axis, the vignetting of the focus detection light beam is generated by the exit pupil of the stop that is disposed at a position other than the exit pupil plane 601 or by the exit pupil that corresponds to a holding frame of a lens other than the stop of the imaging optical system even if an F-value is bright by the exit pupil of the stop.

Figures 7A, 7B:
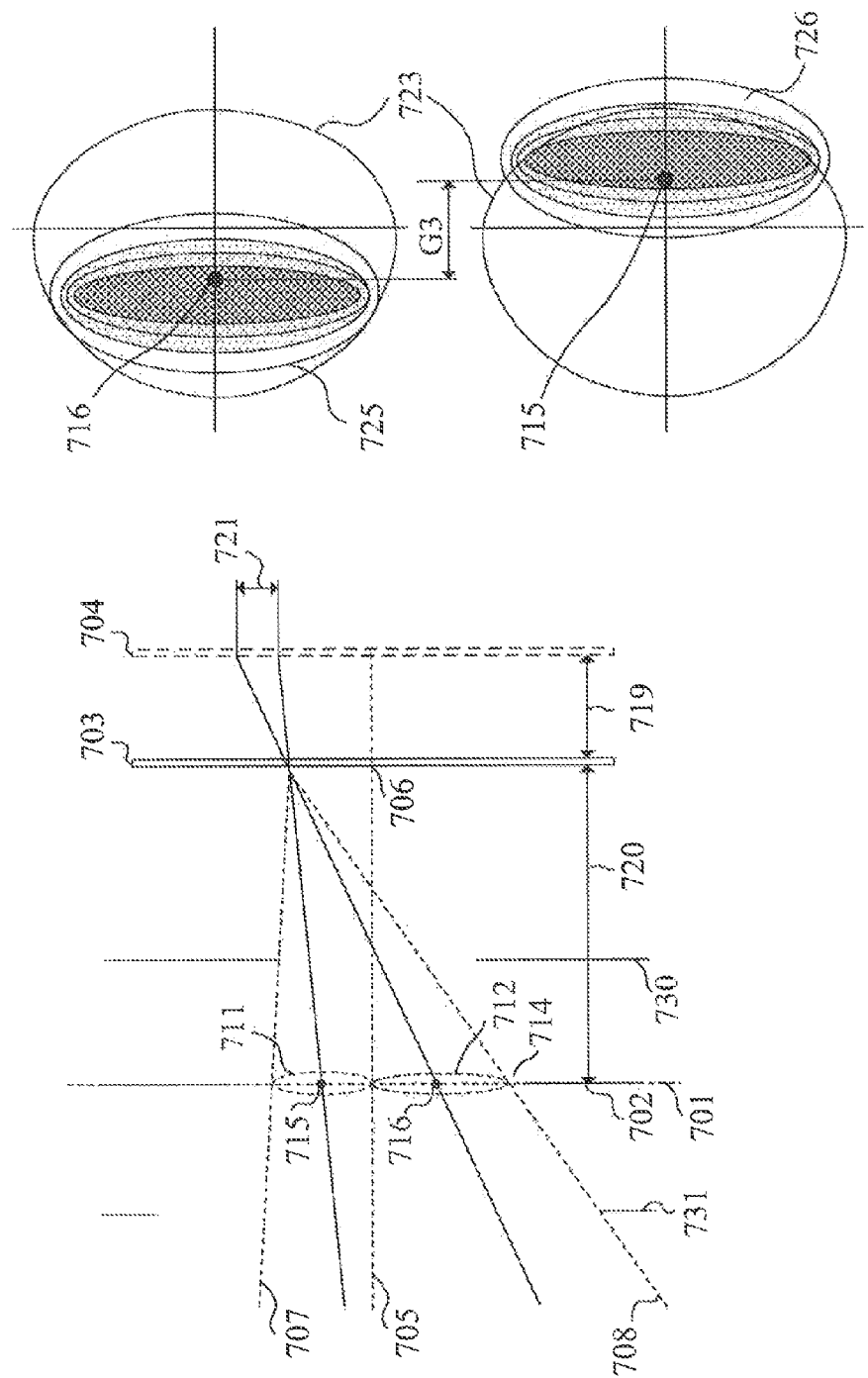
FIGS. 7A and 7B are diagrams of describing a vignetting of the focus detection pixel and a distance of centers of gravity of focus detection light beams.

FIGS. 7A and 7B illustrate a situation in which the light beam is restricted by the lens holding frame for the pixel at a position having an image height with reference to the center of the image sensor. In FIG. 7A, reference numerals 703 and 704 denote an image sensor (reference numeral 703 denotes an image sensor which is disposed at a position of an estimated imaging plane), reference numeral 705 denotes an optical axis, and reference numeral 706 denotes a position of the optical axis on the image sensor. Reference numerals 707 and 708 denote a light beam that is restricted by a lens holding frame 730 that is disposed at a side closest to the image sensor and by a lens holding frame 731 that is at a side closest to the object. Reference numerals 711 and 712 denote focus detection light beams for the light beams 707 and 708, respectively, and reference numerals 715 and 716 denote positions of centers of gravity of the focus detection light beams 711 and 712, respectively.

FIG. 7B is a diagram of illustrating the position of the center of gravity that is caused by the vignetting on the exit pupil plane 701 of the focus detection pixel at a position having an image height with reference to the center of the image sensor. In FIG. 7B, reference numerals 723 denotes a pupil region of the light beams 707 and 708 that are restricted for the pixel having the image height with reference to the center of the image sensor 704. Reference numerals 725 and 726 denote incidence angel characteristics of focus detection pixels $S_{HA}$ and $S_{HB}$, respectively. Lights beam transmitting the inside of the pupil region 723 enter the focus detection pixels $S_{HA}$ and $S_{HB}$ at the sensitivity distributions of the incidence angle characteristics 725 and 726, respectively. Therefore, the distance of the center of gravity that is obtained on conditions that the focus detection light beam is restricted by the lens holding frame can be obtained by obtaining the centers of gravity of the distributions of the focus detection light beams transmitting the inside of the pupil regions 723. The conversion coefficient that is used to calculate the defocus amount based on the image shift amount can be obtained by obtaining the sensitivity distribution information of the focus detection pixel and the diameter information of the imaging optical system by the measurement and the calculation to be previously stored.

In FIG. 7A, a defocus amount 719 is defined as DEF, and a distance 720 from the image sensor 703 to the exit pupil plane 701 is defined as L. A distance of the centers of gravity on conditions that the focus detection light beam is restricted and the focus detection light beam is not restricted by the lens holding frame is defined as G3 (a distance between the positions of centers of gravity 715 and 716). An image shift amount 721 is defined as PRED3, and a conversion coefficient of converting the image shift amount PRED3 into the defocus amount DEF are defined as K3. In this case, the defocus amount DEF can be obtained by the following Expression (3).

$$DEF = K3 \times PRED3 \quad (3)$$

The conversion coefficient K3 that converts the image shift amounts PRED3 into the defocus amount DEF is obtained by the following Expression (4).

$$K3 = L/G3 \quad (4)$$

In the present embodiment, a situation where the light beam is restricted by the lens holding frame in accordance with the position of the focus detection region on the image sensor is illustrated, but the position where the light beam is restricted is also changed by the magnification-varying operation or the change of the focus position due to the movement of each of the lens units 101, 102, and 103. In accordance with the change of the position where the light beam is restricted, the conversion coefficient that converts the image shift amount into the defocus amount changes.

Figure 8:
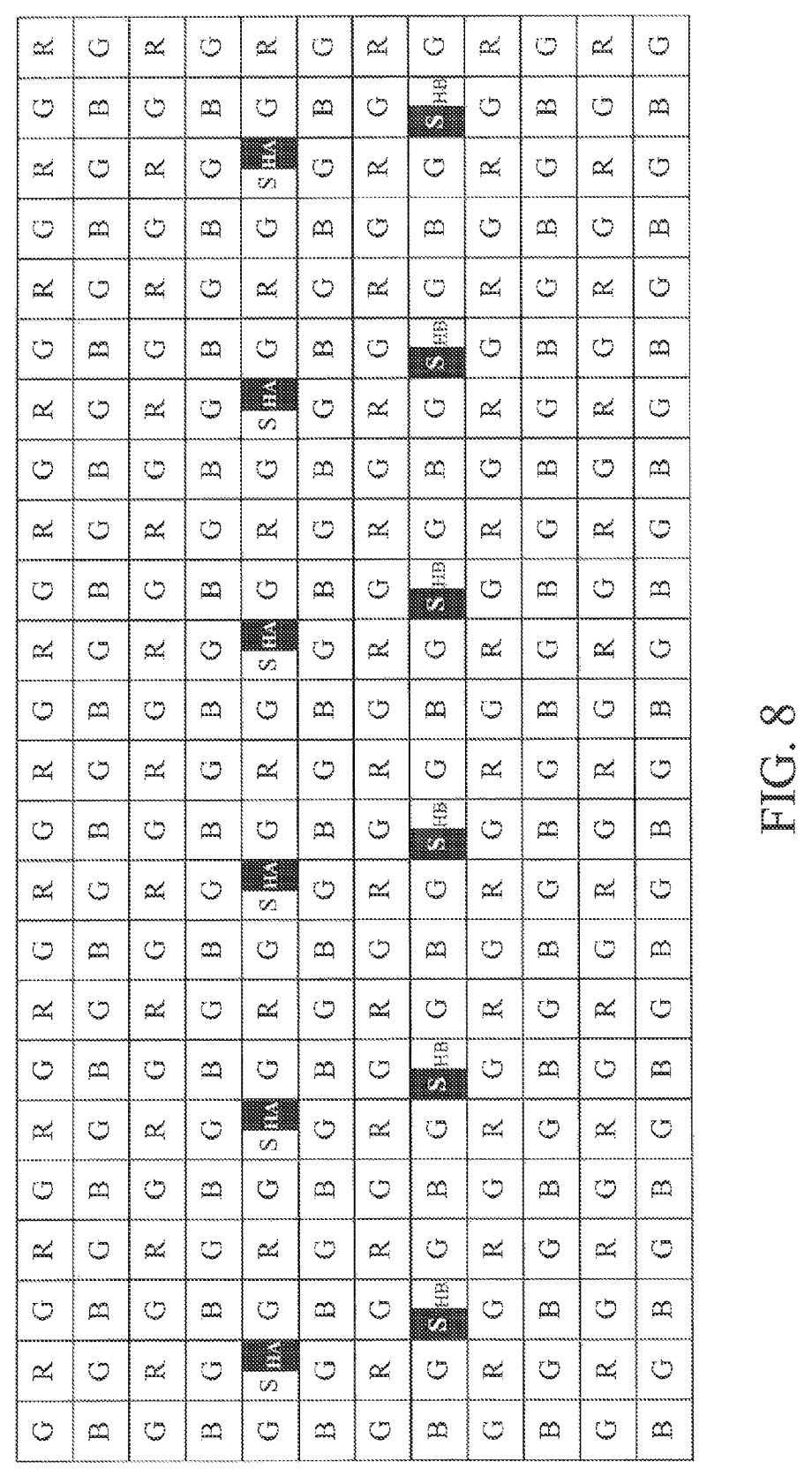

FIG. 8 is an arrangement diagram of the imaging pixels and the focus detection pixels. In FIG. 8, reference sign G denotes a pixel to which a green filter is applied, reference sign R denotes a pixel to which a red filter is applied, and reference sign B denotes a pixel to which a blue filter is applied. Reference sign $S_{HA}$ in FIG. 8 denotes a focus detection pixel that is formed by displacing the opening of the pixel portion in the horizontal direction, which constitutes a reference pixel group that is used to detect an image shift amount in the horizontal direction with reference to an $S_{HB}$ pixel group described below. Reference sign $S_{HB}$ denotes a pixel that is formed by displacing the opening portion of the pixel in an inverse direction with reference to the $S_{HA}$ pixel, which constitutes a reference pixel group that is used to detect the image shift amount in the horizontal direction with reference to the $S_{HA}$ pixel group. White portions in the $S_{HA}$ and $S_{HB}$ pixels indicate opening positions of the displaced pixels.

Figure 9:
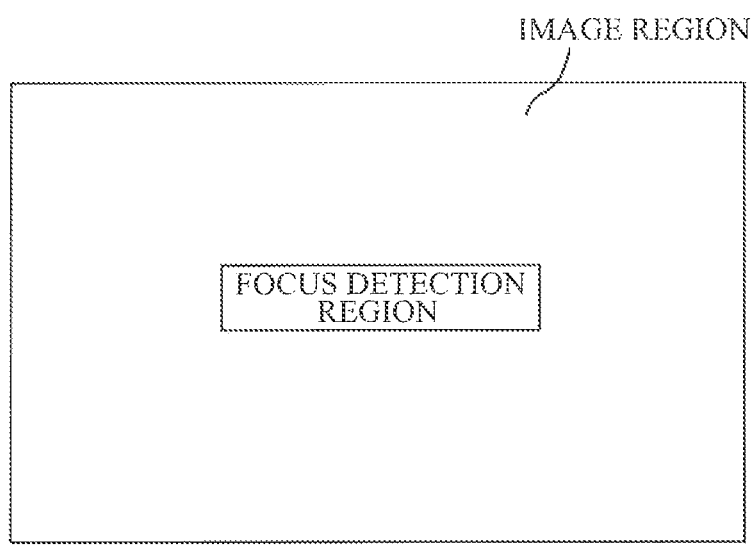
FIG. 9 is an enlarged view of the arrangement region of the focus detection pixels in the present embodiment.

FIG. 9 is one example of a focus detection region on the shooting screen. In FIG. 9, the focus detection region has the pixel arrangement that is illustrated in FIG. 8. In the present embodiment, the focus detection region is set so as to be at a center on the shooting screen, but a plurality of focus detection regions can also be arranged so that a sampling of an image is performed using the focus detection pixels based on the object image formed on each region.

Figure 10:
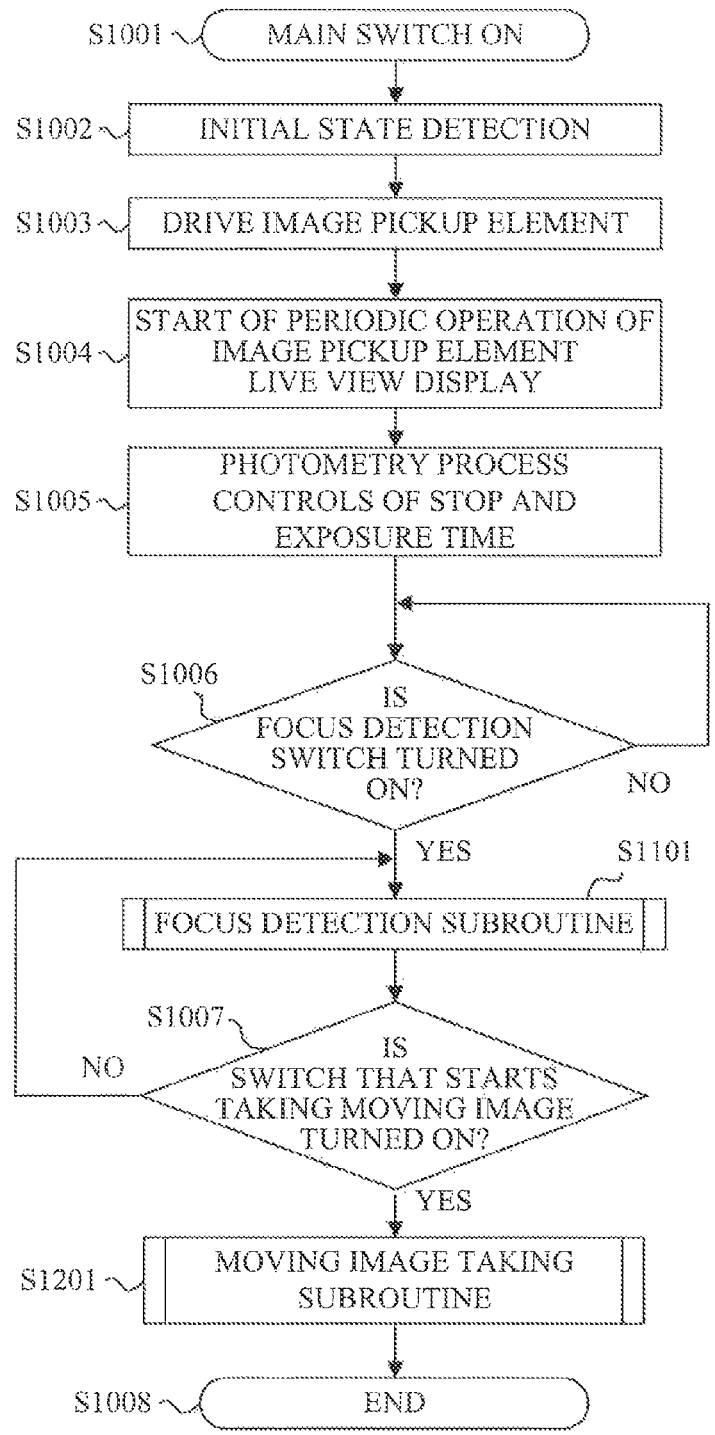
FIG. 10 is a flowchart of illustrating an operation of the camera in the present embodiment.
Figure 11:
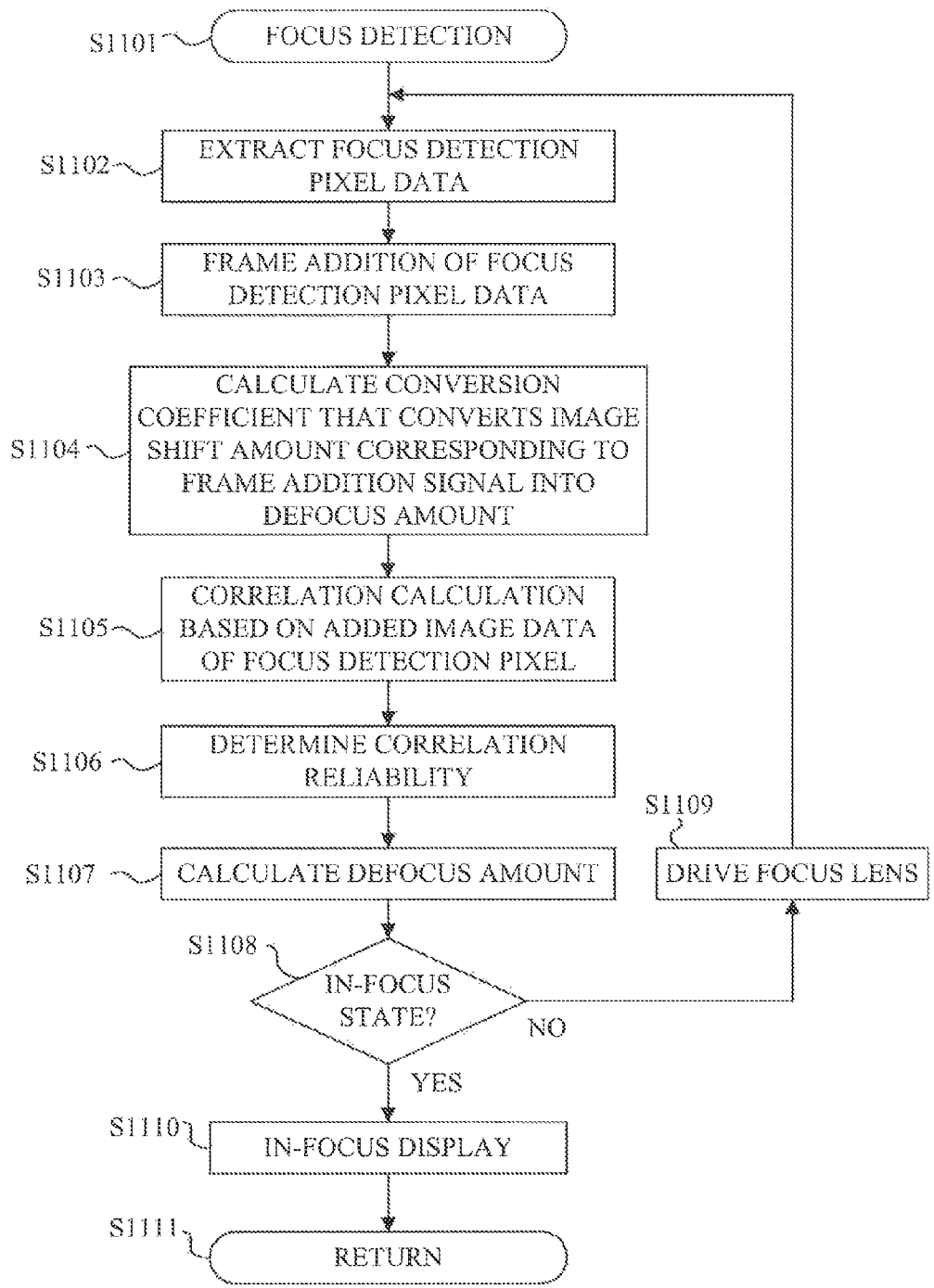
FIG. 11 is a flowchart of illustrating an operation of focus detection in Embodiments 1 and 2.
Figure 12:
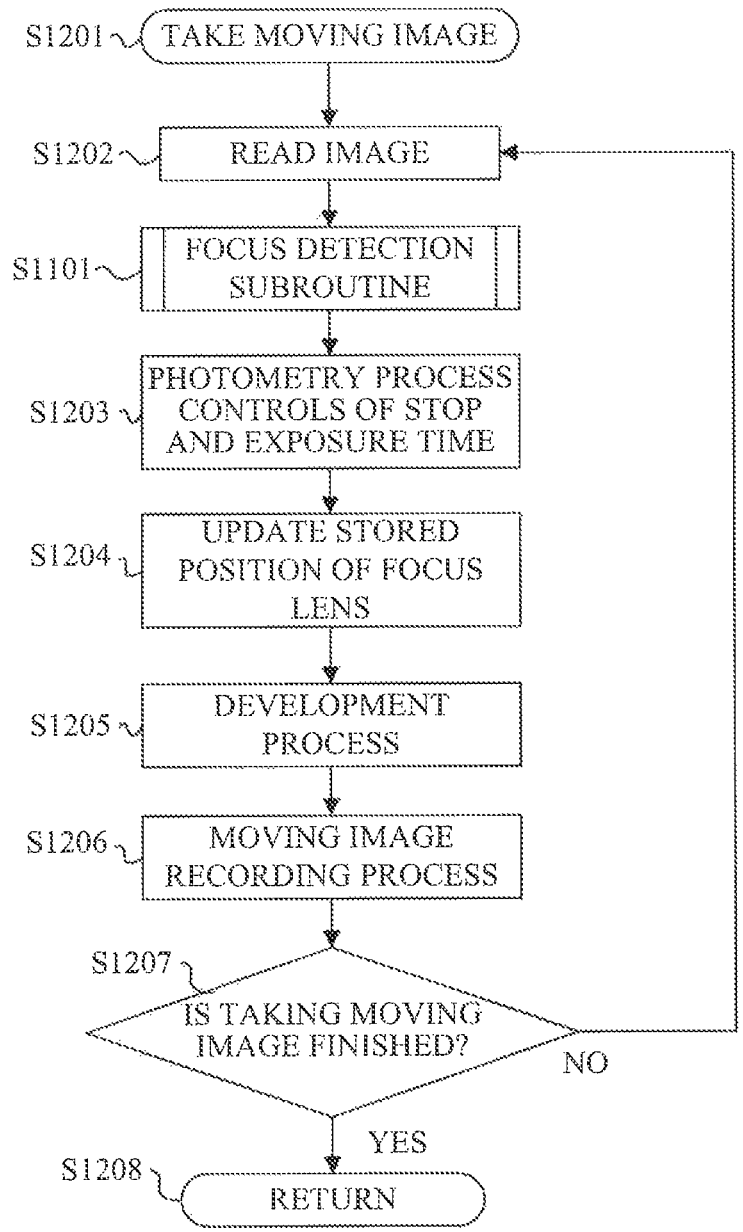
FIG. 12 is a flowchart of illustrating an operation of taking a moving image in the present embodiment.

FIGS. 10 to 12 are flowcharts of describing the focusing operation and the shooting process by the camera. While referring to each drawing described above, control flows of FIGS. 10 to 12 will be described. These controls are performed based on an instruction of a CPU 121 of the camera.

FIG. 10 is a main flow of the camera when a moving image is taken from a state of a live view. First of all, in Step S1001, a user operates a power switch of the camera to be turned on. In accordance with this operation, the CPU 121, in Step S1002, confirms the operations of each actuator and the image pickup element in the camera, and initializes a memory and an execution program and also performs a shooting preparation operation (an initial state detection). Subsequently, in Step S1003, the CPU 121 drives the image pickup element, and starts a periodic shooting operation by the image pickup element by setting a live view mode in Step S1004 to display a live view image on a display unit 131. In this case, the CPU 121 (a readout unit) reads an image signal (a pair of image signals) from the focus detection pixel of the image pickup element 107 with a predetermined period.

In Step S1005, stop control information depending on a displaying stop value that is automatically determined in accordance with the object luminance detected by a photometric sensor (not shown), i.e. a stop value by which an image signal has a level suitable for the display when the image signal is periodically read, is sent to the CPU 121. Alternatively, the stop control information depending on an imaging stop value that is manually set by a user via an operating member (not shown) may also be sent to the CPU 121. A stop aperture diameter is set to the imaging stop value based on this control information. An exposure time is also set appropriately. Subsequently, in Step S1006, whether or not a focus detection switch is turned on is determined, and the camera stands by if the focus detection switch is not turned on, and on the other hand the flow jumps to a subroutine that relates to a focus detection operation during the live view in Step S1101 if the focus detection switch is turned on.

FIG. 11 illustrates a flow of the focus detection during the live view. In Step S1002, the CPU 121 stores focus detection pixel data in the current frame (the image signal read by a pixel readout unit) and optical information of the focus detection pixel data in an internal memory (a storage unit). The optical information is, as describe below, for example a conversion coefficient for each frame. As the optical information, the diameter of the image pickup optical system (the stop, or the lens frame), the focal length, the focus position, or the imaging position of the image height may also be stored in the internal memory. In this case, a conversion coefficient determination unit described below calculates the conversion coefficient for each frame based on such optical information. Subsequently, in Step S1103, the CPU 121 (an addition unit) reads the image data (the image signal) of the focus detection pixel from the internal memory to perform an addition process. In other words, the CPU 121 adds a plurality of signals in time-series continuous frames of the image signals.

Figure 13:
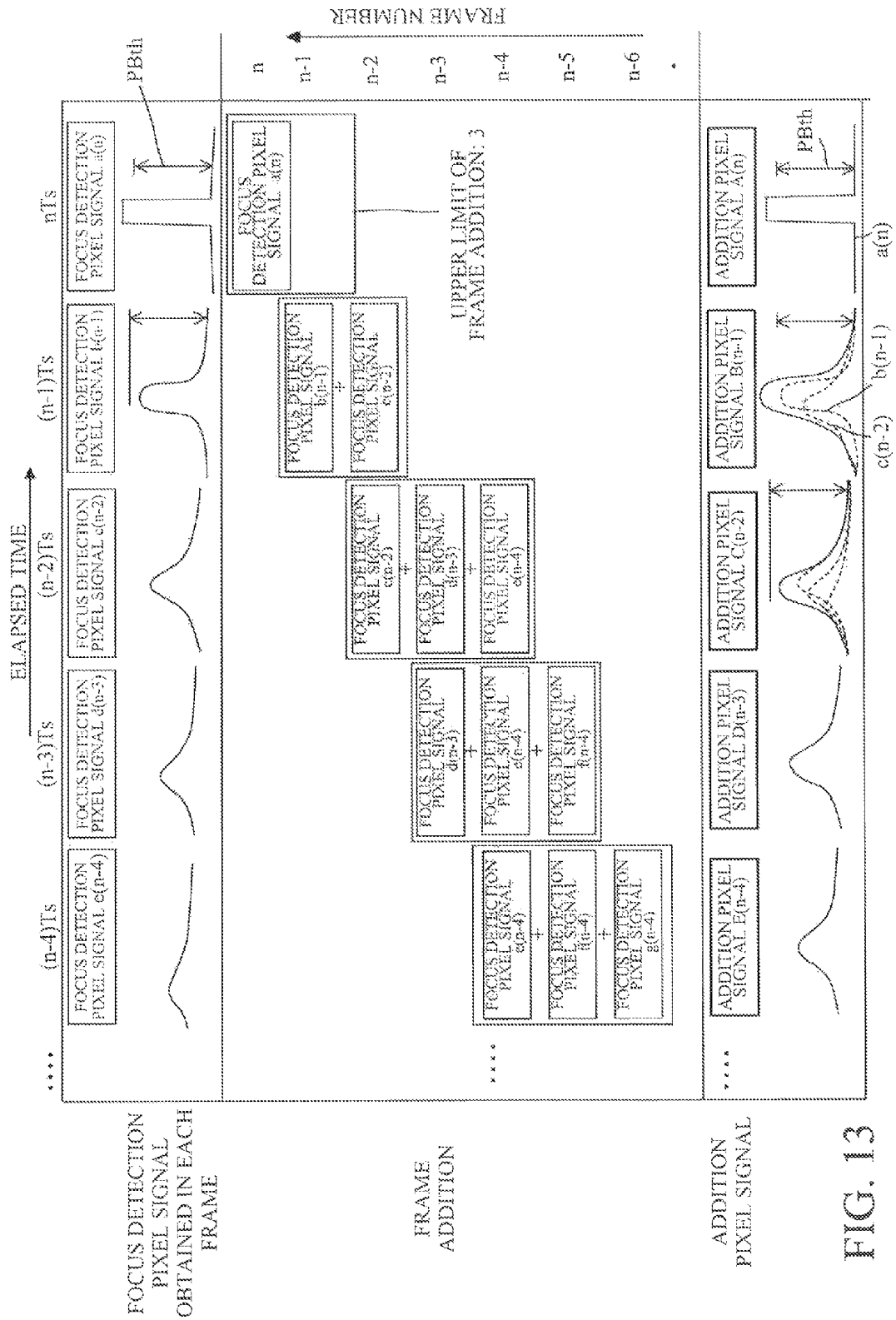
FIG. 13 is a diagram of a method of adding the focus detection pixels of the image pickup element in the present embodiment.

Referring to FIG. 13, the addition process of the image data (the image signals) of the focus detection pixel will be described. In the present embodiment, it is assumed that the focus detection operation can be performed with an overlap while the lens moves to an in-focus position, and FIG. 13 illustrates a situation where the lens comes close to the in-focus position according to the passage of time. In FIG. 13, the passage of time (the elapsed time) of reading the image signal is indicated at the top of FIG. 13. A predetermined period of reading the image signal is denoted by Ts, a reading cycle of the current frame is denoted by n, and time of the current frame is denoted by nTs. The display is refreshed by the latest image data that are read from each frame. The image data of the focus detection pixel read from each frame are stacked and stored in the internal memory. The image signal of the focus detection pixel that is read for the n-th time of the image signal is stored as a focus detection pixel signal a(n).

As a method of performing the addition process, first of all, a difference between the maximum value and the minimum value (a peak-to-bottom value; herein after, referred to as a PB value) of the image data of the focus detection pixels in the current frame is compared with a threshold value PBth, and the focus detection pixel signal is treated as an addition pixel signal when the PB value is beyond the threshold value PBth. In FIG. 13, it is indicated at the time nTs, and a(n) is treated as the addition pixel signal A(n) since the PB value of the focus detection pixel signal a(n) is beyond the threshold value PBth.

When the focus detection pixel signal of the latest frame is not beyond the threshold value PBth, the image data of the focus detection pixel obtained in a past frame are sequentially added and then the addition process is finished when the PB value of the addition pixel signal is beyond the threshold value PBth, and the addition result is treated as the addition pixel signal. In FIG. 13, it is indicated at the time (n−2)Ts. At the time (n−1)Ts, the PB value of the focus detection pixel signal b(n−1) is not beyond the threshold value PBth, and the PB value of the addition pixel signal is beyond the threshold value PBth when the focus detection pixel signal c(n−2) obtained in the previous frame is added to the focus detection pixel signal b(n−1). Therefore, a value of b(n−1)+c(n−2) is treated as an additional pixel signal B(n−1).

Thus, when the difference between the maximum value and the minimum value of the image signals in a predetermined frame is not beyond a predetermined threshold value, the CPU 121 (the addition unit) adds an image signal in a last frame to the image signal in the predetermined frame to calculate the addition result. On the other hand, when this difference is greater than or equal to the predetermined threshold value, the image signal in the predetermined frame is treated as the addition result.

Furthermore, the number of the image data in the past frames which are added to the image data of the current frame (hereinafter, referred to as frame addition number) has an upper limit, and addition data up to the upper limit is treated as the addition pixel signal if the value greater than the upper limit is necessary. In FIG. 13, the upper limit of the frame addition number is set to be three, which is indicated at the time (n−2)Ts. The above description is the method of performing the addition process.

Next, the CPU 121 (the conversion coefficient determination unit) calculates the conversion coefficient that converts an image shift amount of a pair of image signals of an addition frame obtained by the addition unit into a defocus amount in Step S1104 of FIG. 11. In this case, the CPU 121 determines the conversion coefficient of the addition frame based on time-series continuous optical information. This method of determining the conversion coefficient will be described below. In Step S1105, the CPU 121 performs a correlation processing based on the image data added in Step S1103, and performs a reliability determination of the correlation in Step S1106. Subsequently, the CPU 121 is focus detection unit) multiplies the conversion coefficient by the image shift amount obtained by the correlation processing in Step S1107 to calculate the defocus amount. Thus, the CPU 121 as a focus detection unit performs the focus detection based on the addition result of the addition unit.

Next, a method of calculating the conversion coefficient in a case where the time-series addition process is performed for the image data of the focus detection pixel will be described. The method of calculating the conversion coefficient in a case where the defocus amount is calculated based on the image data of the focus detection pixel in one frame is as described above. Hereinafter, as a process that is suitably used in the present embodiment, a conversion coefficient calculation process in a case where the conversion coefficient changes for each addition frame such as a case where the stop is changed during performing the time-series addition of the image data of the focus detection pixel will be described.

As one example, one of a pair of image data for which the addition process has been performed on conditions that the time is mTs and the frame addition number is three is defined as X(m). A case where the image data of the current frame of the image signal constituting the image data X(m) is defined as x(m), the image data obtained in the previous frame is defined as y(m−1), the image data obtained in the frame before the previous frame is defined as z(m−2) is considered. It is assumed that the image shootings are performed by using stops different from each other at the timing of obtaining the image data x(m), y(m−1), and z(m−2), and the conversion coefficients in the frames are defined as $K_m$, $K_{m-1}$, and $K_{m-2}$, respectively. In this case, when the conversion coefficient $K_m$ at the time mTs is used as a conversion coefficient for the pair of image data for which the addition process has been performed, an error is generated in the defocus amount calculated by adding the image data obtained at the timing other than the time mTs at which the conversion coefficient is different. Therefore, providing a conversion coefficient $K_m'$ which is used at the time mTs (the conversion coefficient of the addition frame), an average value of the conversion coefficient for each frame is used as represented by the following Expression (5). The error of the defocus amount is improved by determining the conversion coefficient of the addition frame as described above.

$$K_m' = (K_m + K_{m-1} + K_{m-2})/3 \tag{5}$$

In the present embodiment, the image data of the focus detection pixel that is periodically read and the conversion coefficient are stored for each frame, and a conversion coefficient that corresponds to the addition image data (the addition frame) is calculated in converting the image shift amount into the defocus amount. In the present embodiment, as a value (optical information) that is periodically stored to calculate the conversion coefficient of the addition image data, instead of the conversion coefficient for each frame, a distance of centers of gravity of the focus detection pupils for each frame or diameter information of a lens may also be used to subsequently calculate the conversion coefficient. Considering a rate of a contribution to the image shift amount of the image data of each frame that constitutes the image data X(m), a predetermined weighting may also be performed. When the PB values of the image data x(m), y(m−1), and z(m−2) are denoted by $PB_x$, $PB_y$, and $PB_z$, respectively, the conversion coefficient $K_m'$ is calculated using the following Expression (6).

$$K_m' = (K_m \times PB_x + K_{m-1} \times PB_y + K_{m-2} \times PB_z)/(PB_x + PB_y + PB_z) \qquad (6)$$

In the present embodiment, the case where the frame addition number set to be three is described, but the embodiment is not limited to this and can calculate the conversion coefficient by performing the same process in accordance with the frame addition number. In the present embodiment, the case where the conversion coefficient changes in accordance with the change of the stop (the diameter of the image pickup optical system) is described, but the embodiment is not limited to this. As described above, the conversion coefficient can also be calculated by performing the same process for a case where the conversion coefficient changes in accordance with the change other than the change of the stop.

In Step S1108 of FIG. 11, the CPU 121 determines whether a focus state is near an in-focus state, i.e., whether an absolute value of the calculated defocus amount is within a predetermined value. When the focus state is not near the in-focus state, the flow proceeds to Step S1109 and the CPU 121 (a lens controller) performs a focus lens drive. Specifically, the CPU 121 as the lens controller drives the lens (the third lens unit 105) while controlling a driving speed (operations of the focus driving circuit 126 and the focus actuator 114) of the lens based on the addition number by the addition unit and the result of the focus detection unit. The lens controller, as described below, performs a control so that the driving speed of the lens is reduced when the addition number increases. On the other hand, when it is determined that the focus state is near the in-focus state in Step S1108, the flow proceeds to the Step S1110 to perform the in-focus display, and then the flow returns (Step S111).

Next, in FIG. 10, the flow proceeds to Step S1007, and it is determined whether a switch to start taking a moving image is turned on or not. When the switch is not turned on, the flow returns to Step S1101 and jumps to the subroutine of performing focus detection (Step S1101) again. On the other hand, when the switch to start taking the moving image is turned on, the flow proceeds to Step S1201 and jumps to a subroutine of taking the moving image.

FIG. 12 illustrates a flow of taking the moving image. In Step S1201, when a sequence of taking the moving image starts, reading the image from the image pickup element 107 is performed in Step S1202. Subsequently, the flow proceeds to Step S1101 and the subroutine of detecting the focus detection is performed. Next, in Step S1203, a photometry process and controls of the stop and the exposure time are performed. After the photometry process and the like are finished, the stored focus lens position is updated in Step S1204. Subsequently, in Step S1205, in the image read from the image pickup element 107 in Step S1202, the image data at the position of the focus detection pixel is interpolated from a peripheral imaging pixel and then a development process is performed. Next, in Step S1206, a process of recording the moving image is performed.

Next, the flow proceeds to Step S1207 and it is determined whether recording the moving image is finished or not. According to the result, when recording the moving image is not finished, the flow returns to Step S1202 and reading the image is performed again. On the other hand, when recording the moving image is finished in Step S1207, the flow proceeds to Step S1208, and the sequence of taking the moving image is finished and the flow returns. Then, the flow returns to the main flow of FIG. 10, and a series of operations of taking the image is finished in Step S1008.

According to the present embodiment, since the conversion coefficient of the addition frame is appropriately determined based on the optical information (the conversion coefficient) for each frame, an image pickup apparatus and a camera system that improve calculation accuracy of the defocus amount can be provided.

[Embodiment 2]

Next, Embodiment 2 of the present invention will be described. In Step S1104 (FIG. 11) of Embodiment 1, the average value of the conversion coefficient of each frame constituting the image data of the added focus detection pixel or a weighted addition that adds the rate of contribution to the image shift amount is used to calculate the conversion coefficient. In the present embodiment, in order to simplify the calculation process of the conversion coefficient, the minimum value of the conversion coefficient for each frame is used as a conversion coefficient for an addition frame.

As one example, one of a pair of image data for which the addition process has been performed on conditions that the time is mTs and the frame addition number is three is defined as X(m). A case where the image data of the current frame of the image signal constituting the image data X(m) is defined as x(m), the image data obtained in the previous frame is defined as y(m−1), the image data obtained in the image data in the frame before the previous frame is defined as z(m−2) is considered. It is assumed that the image shootings are performed by using stops different from each other at the timing of obtaining the image data z(m), y(m−1), and z(m−2), and the conversion coefficient in the frames are defined as $K_m$, $K_{m-1}$, and $K_{m-2}$, respectively. In this case, when the conversion coefficient $K_m$ is used as a conversion coefficient $K_m'$ for the pair of image data for which the addition process has been performed at the time mTs, and error is generated in the defocus amount calculated by adding the image data obtained at the timing other than the time mTs at which the conversion coefficient is different. However, when the minimum conversion coefficient of the conversion coefficients $K_m$, $K_{m-1}$, and $K_{m-2}$ is used, the defocus amount is calculated so as to be smaller than an original defocus amount although the error is generated in the calculated defocus amount.

Therefore, according to the present embodiment, the deterioration of the appearance of the shot moving image can be suppressed by performing the focus detection operation with an overlap while moving the focus lens to the focal position without overrunning with respect to an estimated imaging plane in driving the lens.

[Embodiment 3]

Next, Embodiment 3 of the present invention will be described. In the present embodiment, when the conversion coefficient changes while the frame addition is performed, the frame addition is not performed during changing the conversion coefficient. In other words, the CPU 121 (the addition unit) stops adding a plurality of signals in a frame when time-series continuous optical information changes, and starts adding the plurality of signals in the frame after the optical information is changed.

When a setting such as a magnification-varying operation by a rotation of a cam cylinder or a change of a stop value that is a factor of the change of the conversion coefficient is changed, the correlation processing is performed based on the image data for which the frame addition have been performed up to the frame before the setting is changed. Then, the correlation processing is performed based on the image data of the focus detection pixel obtained in one frame during the change of the setting. Hereinafter, instead of the subroutine of the focus detection of FIG. 11 that is referred in Embodiments 1 and 2, the focus detection operation of the present embodiment will be described with reference to a subroutine of focus detection in FIG. 14.

Figure 14:
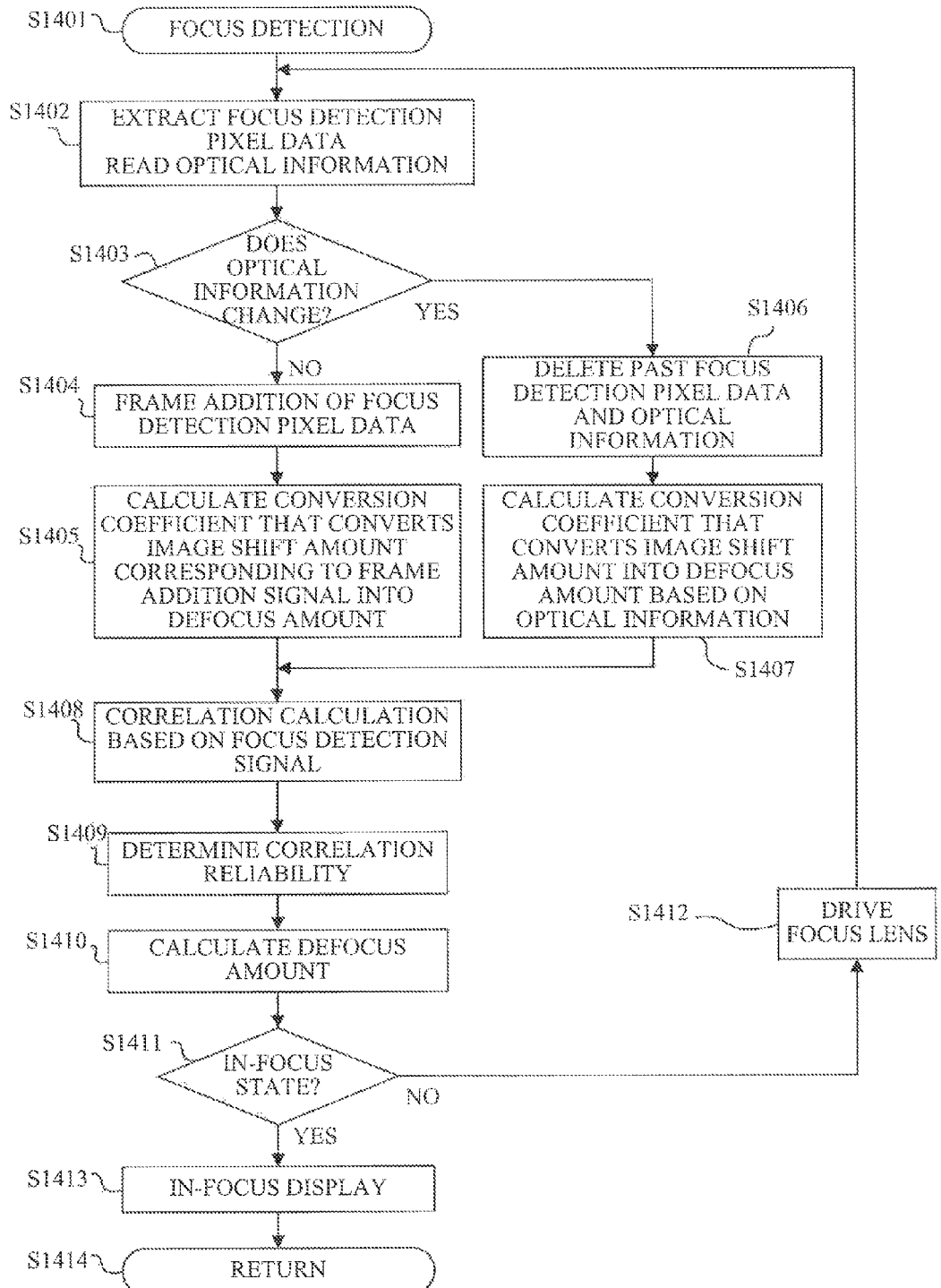
FIG. 14 is a flowchart of illustrating an operation of focus detection in Embodiment 3.

FIG. 14 illustrates a flow of the focus detection during the live view. First of all, in Step S1401, the subroutine of the focus detection starts. Subsequently, in Step S1402, the CPU 121 stores focus detection pixel data in the current frame (an image signal read by a readout unit) and optical information during taking the image (during reading this image signal) in an internal memory (a storage unit). Then, in Step S1403, the CPU 121 determines whether there is a difference between the optical information in the current frame and the past frame during taking the image, i.e. the change of the optical information, based on the optical information stored in the internal memory. When there is no difference between the optical information, the flow proceeds to Step S1404, and the CPU 121 (the addition unit) reads the image data (the image signal) of the focus detection pixel from the internal memory to perform the addition process.

Next, the CPU 121, in Step S1405, calculates the conversion coefficient that is used for converting an image shift amount into a defocus amount based on the optical information corresponding to a frame addition signal. A method of calculating the conversion coefficient is similar to that of the embodiment described above, and therefore the description is omitted.

On the other hand, when the optical information is changed between the current frame and the past frame in Step S1403, the flow proceeds to Step S1406. In Step S1406, the CPU 121 deletes the focus detection pixel data and the optical information stored in the internal memory (or sets the focus detection pixel data and the optical information to be unusable), and performs the focus detection calculation based on the focus detection pixel data and the optical information of the current frame. Subsequently, in Step S1407, the CPU 121 calculates the conversion coefficient that is used for converting the image shift amount into the defocus amount based on the optical information of the current frame. Furthermore, in Step S1408, the CPU 121 performs the correlation calculation based on the image data of the generated focus detection pixel to calculate the image shift amount. Subsequently, in Step S1409, the CPU 121 determines correlation reliability.

Next, in Step S1410, the CPU 121 converts the image shift amount into the defocus amount using the conversion coefficient calculated in Step S1405 or Step S1407. Subsequently, in Step S1411, the CPU 121 determines whether or not the calculated defocus amount is in an in-focus range, and the flow proceeds to Step S1412 when the CPU 121 determines that the defocus amount is out of the in-focus range. In Step S1412, the CPU 121 drives the focus lens setting the calculated defocus amount to be a target position. On the other hand, when the defocus amount is determined to be in the in-focus range in Step S1411, an in-focus display is performed in Step S1413. Then, the flow proceeds to Step S1414, and the flow returns to the main flow of the image pickup operation of the camera.

According to the present embodiment, although the S/N ratio may not be improved by the frame addition process with respect to the image data for the focus detection, the defocus amount can be calculated based on the conversion coefficient in accordance with the image data for the focus detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-090045, filed on Apr. 14, 2011, which is hereby incorporated by reference herein in its entirety.

What is claimed is:

1. An image pickup apparatus comprising:
an image pickup element that includes first pixels and second pixels, configured to perform a photoelectric conversion of an object image via optical elements into an image signal; and
a memory storing instructions which, when executed by a processor, cause the image pickup apparatus to:
read a pair of image signals from the second pixels within a predetermined period, wherein the pair of image signals is used in calculation of a defocus amount;
combine a plurality of signals which are based on the signal read out from the second pixels; and
determine a conversion coefficient that converts the combined plurality of signals into the defocus amount,
wherein the conversion coefficient changes according to a change of the optical elements, and
wherein combining the plurality of signals stops when the conversion coefficient is changed, and combining the plurality of signals starts after the conversion coefficient is changed.

2. The image pickup apparatus according to claim 1, wherein combining the plurality of signals includes adding a plurality of signals of time-series continuous frames of the pair of image signals.

3. The image pickup apparatus according to claim 2, wherein the conversion coefficient of an obtained additional frame is determined using an average value of a conversion coefficient for each of the time-series continuous frames.

4. The image pickup apparatus according to claim 2, wherein a conversion coefficient of each of the time-series continuous frames is weighted to determine the conversion coefficient of an obtained additional frame.

5. The image pickup apparatus according to claim 2, wherein the conversion coefficient of an obtained additional frame is determined using a minimum value of a conversion coefficient for each of the time-series continuous frames.

6. The image pickup apparatus according to claim 1, wherein the conversion coefficient converts an image shift amount of a pair of image signals of an obtained additional frame into the defocus amount.

7. The image pickup apparatus according to claim 1, wherein the memory further stores the read pair of image signals and optical information of the pair of image signals.

8. The image pickup apparatus according to claim 7, wherein the optical information stored in the memory is a conversion coefficient for each frame.

9. The image pickup apparatus according to claim 7, wherein the optical information stored in the memory is information related to at least one of a diameter of an image pickup optical system, a focal length, a focus position, and an imaging position of an image height, and
wherein the conversion coefficient is calculated for each frame based on the optical information to determine the conversion coefficient of an obtained additional frame based on the conversion coefficient for each frame.

10. The image pickup apparatus according to claim 1, wherein the optical elements include a stop member, and
wherein the conversion coefficient changes according to a driving of the stop member.

11. The image pickup apparatus according to claim 1, wherein the optical elements include a lens, and
   wherein the conversion coefficient changes according to a moving of the lens.
12. A camera system comprising:
   a lens apparatus including a lens, configured to form an object image; and
   an image pickup apparatus according to claim 1.

* * * * *